United States Patent Office 3,194,816
Patented July 13, 1965

3,194,816
PURIFICATION OF 1,2,3,4-CYCLOPENTANETETRACARBOXYLIC ACID AND PREPARATION OF ITS ANHYDRIDE
Ross Van Volkenburgh and Jerome R. Olechowski, Baton Rouge, and Grover C. Royston, Baker, La., assignors to Copolymer Rubber & Chemical Corporation, a corporation of Louisiana
No Drawing. Filed Dec. 18, 1961, Ser. No. 160,353
11 Claims. (Cl. 260—346.3)

This invention relates to the purification of oxygen-containing organic compounds and, in one of its more specific variants, to the preparation of derivatives therefrom which are characterized by improved color and other desirable properties.

The invention will be illustrated and described hereinafter with specific reference to the purification of tetracarboxylic acids and other oxygen-containing organic compounds prepared by nitric acid oxidation of certain ethylenically unsaturated compounds to be more fully defined hereinafter. However, it is understood that other methods of oxidation may be used to oxidize the ethylenically unsaturated compounds.

Nitric acid oxidation has been used heretofore for the preparation of tetracarboxylic acids. In one nitric acid oxidation process, a Diels-Alder adduct of a 1,3-butadiene and maleic anhydride is oxidized to produce a butane tetracarboxylic acid by addition of the adduct to fresh, relatively dilute nitric acid solution in the presence of a molybdenum or vanadium catalyst. The oxidation of the adduct has been found to take place only after an extended induction period when no apparent oxidation is taking place, which may be as long as 20 to 30 minutes, and then the oxidation may proceed very vigorously to the point of explosion. Thus, little or no control of the oxidation is possible and this has resulted in a low yield of the desired tetracarboxylic acid. The high solubility of the resultant tetracarboxylic acid product in the dilute nitric acid reaction mixture further reduces the over-all yield to a point where the prior art nitric acid oxidation processes are entirely unsatisfactory from an economic standpoint.

The tetracarboxylic acids and other oxygen-containing organic compounds available heretofore by nitric acid oxidation of ethylenically unsaturated compounds defined herein are not entirely satisfactory for many purposes. For instance, while the prior art products often are not discolored initially or may be recrystallized from water to improve the color, derivatives, prepared therefrom such as the monoanhydride, dianhydride, esters, etc. are discolored therby rendering them less satisfactory for use in the manufacture of products which normally have a light color or are colorless.

The purification process of the present invention overcomes the above-mentioned and other disadvantages of the prior art. It has been discovered that the discoloration characteristic of derivatives prepared from tetracarboxylic acids and other oxygen-containing compounds produced by oxidation of ethylenically unsaturated compounds having formulae as defined herein may be markedly reduced by first purifying the oxygen-containing organic compound in accordance with the invention. Derivatives then may be prepared from the purified oxygen-containing compound without undue discoloration. It has been further discovered that the process of the present invention is especially useful for the purification of 1,2,3,4-cyclopentanetetracarboxylic acids, and especially cis,cis,cis,-cis-1,2,3,4-cyclopentanetetracarboxylic acid prepared by nitric acid oxidation of the Diels-Alder adduct of cyclopentadiene and maleic anhydride.

It is an object of the present invention to provide an improved process for purifying oxygen-containing organic compounds prepared by oxidation of ethylenically unsaturated compounds having formulae as defined herein.

It is a further object of the present invention to provide an improved process for purifying tetracarboxylic acids prepared by oxidation of ethylenically unsaturated compounds having formulae as defined herein.

It is still a further object of the present invention to provide an improved process for purifying tetracarboxylic acids and other oxygen-containing organic compounds having nitrogen-containing impurities which were prepared by a process including nitric acid oxidation of the Diels-Alder adducts defined herein.

It is still a further object of the present invention to provide an improved process for preparing derivatives of improved color from the above-mentioned tetracarboxylic acids and other oxygen-containing organic compounds which have been first purified in accordance with the invention.

It is still a further object of the present invention to provide an improved process for purifying 1,2,3,4-cyclopentanetetracarboxylic acid which was prepared by nitric acid oxidation of the Diels-Alder adduct of cyclopentadiene and maleic anhydride, and to prepare an anhydride or other derivatives of improved color from the resultant purified 1,2,3,4-cyclopentanetetracarboxylic acid.

Still other objects and advantages of the invention will be apparent to those skilled in the art upon reference to the following detailed description and the examples.

In accordance with the present invention it has been discovered that oxygen-containing organic compounds prepared by oxidation of ethylenically unsaturated compounds having formulae as defined herein may be purified by intimate contact with a liquid comprising an organic carboxylic acid containing 1–4 inclusive carbon atoms or by crystallizing from a solvent comprising water and a carboxylic acid containing 1–4 inclusive carbon atoms. Preferably the two purification procedures should be used in combination when optimum results are desired. However, either purification procedure alone will result in a marked reduction in the impurity level and derivatives prepared from the purified material will have a substantially improved color. The compound to be purified may be contacted with one or a mixture of substantially pure organic carboxylic acids containing 1–4 inclusive carbon atoms over a period of time and in a volume sufficient to extract at least a portion of the objectionable impurities and thereby reduce the impurity content. If desired, the acid may contain a diluent such as water in an amount such as about 1–20% by volume, but preferably the concentrated acid is used as the compound to be purified usually is highly water soluble and lower yields of purified product are obtained. Better results are usually obtained when the compound and liquid are contacted in a ratio providing at least 100 ml., and preferably at least 150 ml., of liquid for each 100 gr. of compound to be purified, but some improvement is obtained with much lower ratios such as when only 5, 10, 25 or 50 ml. of liquid are contacted with each 100 gr. of compound. The rate of extraction of impurities may be increased markedly and an equilibrium reached in a much shorter period of time by agitating the resultant slurry and/or by heating to an elevated temperature such as between 35–50° C. and the boiling point of the liquid. Usually contact with the liquid for only 1–30 minutes will reduce the impurity content, but much longer periods of time are preferred in instances where an optimum level of purification is desired. For example, the liquid and compound may be contacted for 1–12 hours or longer. The purified product then may be filtered from the liquid, dried and then used in the preparation of derivatives of improved color.

Often exceptionally good results are achieved by crystallizing the impure compound from a solvent which is a mixture of water and one or more carboxylic acids containing 1–4 inclusive carbon atoms. Preferably, the solvent is heated to an elevated temperature up to the boiling point and the impure compound dissolved therein in an amount providing a precipitate of purified product upon cooling to a lower temperature such as normal room temperature. The resultant purified product then may be filtered from the cooled mother liquor, dried and used in the preparation of derivatives of improved color. The solvent should contain by volume at least 5–10% of water and not over about 90–95%. Preferably, the solvent contains by volume about 10–90 parts of water and about 90–10 parts of the carboxylic acid. Better results are obtained with solvents containing by volume about 20–40 parts of water and about 80–60 parts of carboxylic acid. Optimum results are obtained in some instances with a solvent mixture conaining by volume about 25 parts of water and about 75 parts of carboxylic acid, and in other instances with a solvent mixture containing about 50 parts of water and about 50 parts of carboxylic acid.

In instances where a maximum degree of purification is desired, the compound to be purified should be first intimately contacted with the carboxylic acid in a preliminary purification step, and then the resultant purified product recovered from the liquid and crystallized from the water-carboxylic acid solvent. The purified compound resulting from the combined purification procedures may be used in preparing derivatives characterized by greatly improved color and often no noticeable discoloration.

Monocarboxylic acids containing 1–4 inclusive carbon atoms which are miscible with water in all proportions, and especially formic acid and acetic acid, are usually preferred for use in both of the purification procedures. It has been found that water alone as the solvent is unsatisfactory since objectionable impurities remain in the recrystallized product and cause objectionable discoloration in derivatives prepared therefrom. This is true even after repeated recrystallizations from water.

The oxygen-containing organic compounds to be purified in accordance with the present invention may be prepared by oxidizing with an oxidizing agent a Diels-Alder adduct of a diene selected from the group consisting of

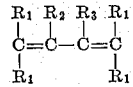

and

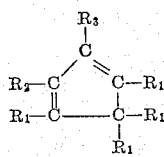

wherein $R_1$, $R_2$ and $R_3$ are monovalent substituents, and a dienophile selected from the group consisting of monoethylenically unsaturated dicarboxylic acids having the formula

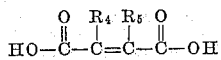

and anhydrides and esters thereof, wherein $R_4$ and $R_5$ are monovalent substituents. The adducts may be oxidized with nitric acid and other suitable oxidizing agents to produce the desired product.

Nitric acid is a preferred oxidizing agent. However, it has been discovered that nitric acid oxidation results in the presence of nitrogen-containing impurities which cause very pronounced discoloration when the resultant compound is used in preparing a derivative. It has been further discovered that the process of the invention is especially useful in purifying nitric acid oxidation products. Thus, the present invention offers many advantages in the purification of crude, solid, tetracarboxylic acids and other oxygen-containing compounds including nitrogen-containing impurities prepared by a process including nitric acid oxidation of the Diels-Alder adducts described herein.

While any suitable nitric acid oxidation process may be used in preparing the compounds to be purified, it is preferred that the Diels-Alder adduct be oxidized by bringing it into intimate contact initially with a solution containing 10–90% by weight nitric acid and comprising nitric acid solution previously used in an oxidation of the adduct and containing oxidation products resulting therefrom in an amount effective to substantially reduce the induction period. For some reason which is not fully understood at the present time, the presence of previously used or recycled nitric acid or the oxidation products contained therein results in a sharp reduction or elimination of the induction period and allows the oxidation to commence without delay and proceed at a rate which allows easy control.

The preferred nitric acid oxidation process may be carried out continuously under conditions whereby the double bond of the adduct is cleaved oxidatively to produce the oxygen-containing compound. The normaly solid adduct may be added intermittently at frequent intervals or continuously to an oxidation vessel, and nitric acid solution of the desired strength likewise is supplied to the oxidation vessel at frequent intervals or continuously. It is usually preferred that about 4–10 mols of nitric acid be present for each mol of adduct. The adduct and nitric acid solution contents of the reaction vessel may be agitated and maintained at the desired oxidation temperature, and a stream of nitric acid solution containing the oxidized adduct may be withdrawn therefrom intermittently at frequent intervals or continuously, cooled to precipitate the product, the precipitated product filtered therefrom, and at least a portion of the withdrawn nitric acid solution, preferably after recovery of product but still containing oxidation products, recycled back to the oxidation vessel. The withdrawn nitric acid solution may be fortified with concentrated nitric acid to the desired nitric acid content prior to recycle to the reaction vessel, if desired. A portion of the withdrawn nitric acid solution may be evaporated to concentrate the product, and then cooled to precipitate additional product before discarding. Normally, a sufficient volume of solution is withdrawn from the system and discarded to prevent buildup of an excessive volume of solution.

While a continuous process is usually preferred, it is possible to practice the invention by what is essentially a batchwise operation. For example, the adduct may be added incrementally or continuously to a vessel containing nitric acid solution of the proper concentration which also contains recycled or previously used nitric acid solution as described above. Additional nitric acid may be added thereto during the oxidation reaction to provide or maintain the desired level of nitric acid in the reactants. Upon completion of the oxidation, the entire reaction mixture may be cooled to precipitate the product which may be recovered by filtration, a portion of the nitric acid solution discarded for concentration and further recovery of product, and the remainder fortified with fresh concentrated nitric acid to a desired initial level and the oxidation process repeated.

Nitric acid concentrations of 10–90% by weight in aqueous, carboxylic acid, or aqueous carboxylic acid solution have been found to be satisfactory. Aqueous nitric acid is usually preferred, and the carboxylic acid when present may contain 1–4 inclusive carbon atoms with acetic acid usually giving better results.

Higher recoveries of product are obtained by precipitation from aqueous reaction mixtures when the nitric acid concentration is about 40–45% by weight and preferably 50–65% by weight or higher, since it has been discovered unexpectedly that the normally highly soluble tetracarboxylic acid or other product is substantially less soluble in nitric acid solutions of this concentration. This is especially true with nitric acid concentrations of at least 55% by weight or higher, and for best results it is often preferred to operate at about 60% by weight nitric acid. If desired, the nitric acid solution may contain dissolved nitrogen tetroxide. The percent by weight nitric acid in the solutions referred to herein is based on the weight of $HNO_3$ dissolved in the weight of solvent which is usually water, and other substances which may be present such as adduct or oxidation products are not included in making the calculations.

The nitric acid oxidation should be effected at a temperature not greater than about 120° C. such as 35–120° C., and preferably at about 35–80° C. when the nitric acid concentration is 40% by weight or above. Within the temperature range of 35–120° C., lower concentrations of nitric acid within the 10–90% by weight range should be selected for higher reaction temperatures, and higher concentrations of nitric acid should be selected for lower reaction temperatures. Usually, a nitric acid concentration of 45–65% by weight is preferred at temperatures within the range of 35–75° C., and temperatures of about 50–70° C. at nitric acid concentrations of about 50% to 60% $HNO_3$.

In continuous nitric acid oxidation processes, better yields may be obtained at relatively short reaction times. The preferred reaction time may vary somewhat with the nitric acid concentration and the reaction temperature, but usually an average residence time in the reaction zone of about 1–30 minutes is satisfactory. Within this range, shorter reaction times are preferred for higher reaction temperatures and nitric acid concentrations, and longer reaction times at lower reaction temperatures and nitric acid concentrations. An average residence time of about 1–15 minutes may produce better results at nitric acid concentrations above 40% by weight and especially about 1–5 minutes at nitric acid concentrations of about 55–65% by weight. Immediately after withdrawal from the reaction zone or vessel, preferably the reaction mixture is quenched to terminate the oxidation by lowering the temperature rapidly or diluting with water. Upon lowering the temperature rapidly and preferably below 35° C., the product crystallizes and may be recovered by filtration. At nitric acid concentrations above about 40–45% by weight, and especially above about 50–60% by weight, it has been discovered that a further important advantage is gained in continuous operation since the tetracarboxylic acid or other product is much less soluble in the reaction mixture. This results in higher yields since most of the product is recovered prior to recycle back to the oxidation step and further oxidation of the desired tetracarboxylic acid or other product to undesirable products or complete degradation is prevented.

In most instances it is preferred that the normally solid Diels-Alder adduct be added incrementally to the reaction mixture and preferably at about the rate of oxidation. However, this is not always necessary and it is possible for example to add the nitric acid solution directly to the adduct.

A molybdenum or vanadium-containing catalyst such as a soluble alkali molybdate or alkali vanadate, including sodium, potassium and ammonium molybdates and vanadates, may be used as a catalyst for the nitric acid oxidation. However, unexpectedly it has been found that the reaction proceeds very satisfactorily in the absence of a catalyst in some instances, and especially when oxidizing a Diels-Alder adduct as described herein prepared from a cyclopentadiene. The oxidation of the Diels-Alder adduct of cyclopentadiene and maleic anhydride in the absence of a heavy metal catalyst proceeds very uniformly and without an induction period when practicing the present invention, and superior results may be obtained.

In instances where it is desired to prepare an anhydride derivative of a tetracarboxylic acid purified in accordance with the invention such as an anhydride of cis,cis,cis,cis-1,2,3,4-cyclopentanetetracarboxylic acid, this may be accomplished by refluxing the tetracarboxylic acid with an organic carboxylic acid anhydride such as acetic anhydride. The resultant tetracarboxylic acid dianhydride may be recovered from the reaction mixture by cooling and filtration. An alternative method of preparing an anhydride is to heat purified tetracarboxylic acid product to a temperature of 130–230° C., and preferably under a vacuum such as 10 mm. Hg to dehydrate the same and produce an anhydride, which may be the monoanhydride, the dianhydride or a mixture of mono- and dianhydrides. The dianhydride of cis,cis,cis,cis-1,2,3,4-cyclopentanetetracarboxylic acid is exceptionally useful in a number of commercial applications, such as in the preparation of esters suitable for lubricants and as a curing agent for epoxy resins.

The Diels-Alder adducts to be oxidized may be prepared by conventional practices well known to the art. The dienes useful in preparing the Diels-Alder adduct embrace those selected from the group consisting of

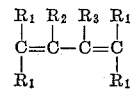

and

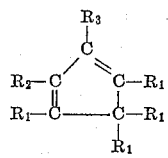

wherein $R_1$, $R_2$ and $R_3$ are any suitable monovalent substituents. While a wide variety of suitable monovalent substituents are known to the art and may be used, certain exemplary ones include hydrogen, alkyl, cycloalkyl or alkyl substituted cycloalkyl groups containing 1–20 and preferably 1–8 carbon atoms, aryl and alkylaryl groups containing 1–20 and preferably 1–8 carbon atoms, halogen and especially chlorine which may impart fire resistance or other desirable properties to the resultant products, and sulfur or phosphorus containing substituents such as phosphoric or sulfuric acid groups (phosphates or sulfates) which likewise may impart fire resistance. Specific examples of suitable dienes include butadiene, isoprene, piperylene, cyclopentadiene, and alkylcyclopentadienes wherein the alkyl group contains 1–8 and preferably 1–4 carbon atoms, including methylcyclopentadiene, ethylcyclopentadiene, dimethylcyclopentadiene and methylethylcyclopentadiene.

The dieneophiles which may be used in preparing the Diels-Alder adduct embrace those selected from the group consisting of monoethylenically unsaturated dicarboxylic acids having the formula

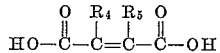

and anhydrides and esters thereof, wherein $R_4$ and $R_5$ are monovalent substituents. Esters of the dicarboxylic acid may be prepared from any suitable alcohol such as alcohols containing 1–20 and preferably 1–8 carbon atoms. In general, $R_4$ and $R_5$ may be any suitable substituents which allow preparation of satisfactory Diels-Alder adducts for use in the invention and may embrace the substituents described above for $R_1$, $R_2$ and $R_3$. Specific examples of monoethylenically unsaturated dicarboxylic acids satisfactory for practicing the invention include fumaric acid and maleic acid, and their ester, anhydride and chloro- or dichloro-derivatives.

Preferred results are obtained when $R_1$ through $R_5$ are certain substituents, and especially when a desired end product is to be produced and purified. For example, when preparing a purified tetracarboxylic acid it is desirable that $R_2$ and $R_3$ be hydrogen since the tetracarboxylic acid is produced upon oxidative cleavage of the double bond between the carbon atoms to which the hydrogen is attached. However, in instances where $R_2$ and $R_3$ are alkyl or cycloalkyl, it is possible to form a keto acid or diketo acid which upon further oxidation produces the tetracarboxylic acid. Preferably, the Diels-Alder adduct is prepared from maleic anhydride and cyclopentadiene in instances where it is desired to produce purified 1,2,3,4-cyclopentanetetracarboxylic acid. This specific tetracarboxylic acid has been found to have many unusual properties.

The materials to be oxidized to produce compounds for purification in accordance with the invention include compounds having the following structural formulae:

(1) 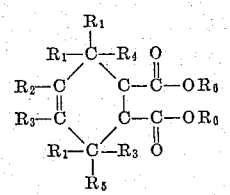

(2) 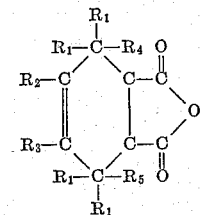

(3) 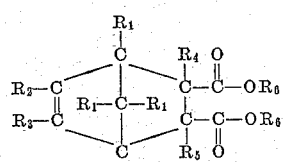

(4) 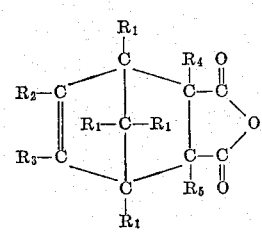

wherein $R_1$ through $R_5$ are monovalent substituents as discussed above for the dienes and dieneophiles and $R_6$ is hydrogen or an alcoholic residue derived, for example, by reacting an alcohol containing 1-20 and preferably 1-8 carbon atoms with the dibasic acid. Such compounds may be conveniently prepared by subjecting the dienes and dieneophiles mentioned herein to a Diels-Alder reaction. However, other methods of preparation may be used and the Diels-Alder adducts recited in the specification and claims are intended to encompass compounds of the above formulae. The carbon-carbon double bond in each formula is attacked upon nitric acid oxidation thereby resulting in oxygen being attached directly to the two carbon atoms. When it is desired to prepare a tetracarboxylic acid for purification preferably $R_2$ and $R_3$ are hydrogen and the double bond is cleaved on nitric acid oxidation to form two carboxylic groups. When $R_2$ and $R_3$ are organic radicals, the keto- groups formed initially on nitric acid oxidation and cleavage of the double bond are further oxidized to form carboxylic groups. The ester or anhydride linkages when present may be hydrolyzed to form two additional free carboxylic groups and thus result in preparation of the desired tetracarboxylic acid.

The foregoing detailed description and the following specific example are for purposes of illustration only, and are not intended as being limiting to the spirit or scope of the appended claims.

*Example I*

100 grams (0.61 mol) of the Diels-Alder adduct of cyclopentadiene and maleic anhydride (endo-cis-bicyclo [2.2.1]hept-5-ene-2,3-dicarboxylic anhydride) was added incrementally over a two hour period to 189 grams of aqueous nitric acid containing 60% by weight $HNO_3$. No heavy metal catalyst was present. The temperature of the resultant reaction mixture was maintained at 60° C., and periodic additions of 90% $HNO_3$ were used to maintain the concentration of the nitric acid solution at 60% $HNO_3$. The reaction mixture was stirred over the two hour period of addition, and then stirred for an additional one and one-half hours while maintaining the temperature at 60° C. Thereafter, the reaction mixture was cooled and the resultant precipitated cis,cis,cis,cis-1,2,3,4-cyclopentanetetracarboxylic acid product was removed by filtration. The filtrate was fortified with 90% $HNO_3$ to the original 60% $HNO_3$ level, and the oxidation cycle was repeated using additional 100 gram portions of the adduct and following the same procedure.

In the first oxidation cycle, an induction period of approximately 20 minutes was noted before the reaction began. This induction period was not present in later cycles where the nitric acid solution contained recycled nitric acid.

The melting point of the crude product obtained from the oxidation cycles was about 170-178° C. and the yield was about 80-85% of the theoretical based on the adduct. Use of 0.25% of an ammonium vanadate catalyst in one of the cycles did not increase the yield. The crude product was found to have nitrogen-containing impurities and was used in the following examples.

*Example II*

A 10 gram sample of crude cis,cis,cis,cis-1,2,3,4-cyclopentanetetracarboxylic acid prepared in accordance with Example I was slurried with 50 milliliters of glacial acetic acid, heated to boiling, and allowed to stand overnight at room temperature. Then, the liquid was removed by filtration to thereby obtain 6.5 grams of purified product which had a melting point of about 197° C. (reported melting point 195° C. dec.), and a neutralization equivalent of 61.7 as determined in acetone (theory 61.5).

The crude material had a melting point of about 170–178° C. and a strong odor of nitric acid or nitrogen oxides. The purified product had the proper melting point and neutralization equivalent for cis,cis,cis,cis-1,2,3,4-cyclopentanetetracarboxylic acid, and also had an improved color and was free of nitric acid and nitrogen oxide odors.

*Example III*

A larger sample (310 grams) of the crude cis,cis,cis,cis-1,2,3,4-cyclopentanetetracarboxylic acid product obtained by the procedure of Example I was treated with 300 milliliters of glacial acetic acid in the manner of Example II. In this example, 280 grams or about 90.5% of the starting material was recovered. However, while a substantial improvement was noted this product was of lower purity than that obtained in Example II, as was apparent from the neutralization equivalent (62.4) and the melting range (185–192° C.).

*Example IV*

10 grams of crude cis,cis,cis,cis-1,2,3,4-cyclopentanetetracarboxylic acid product prepared in accordance with Example I was dissolved in 15 milliliters of distilled water at 90° C. Glacial acetic acid was then added while heating the mixture until a slight cloudiness persisted at the above temperature. The mixture was heated to boiling and the cloudiness disappeared. The solution was cooled overnight at 25° C. to yield 6.5 grams of white crystalline material having a neutralization equivalent of 61.3. The melting point was about 197° C. It is thus apparent that the crude product of Example I was rendered substantially pure by crystallization from the glacial acetic acid-water solvent.

*Example V*

Anhydrides were prepared of the various cis,cis,cis,cis-1,2,3,4-cyclopentanetetracarboxylic acid products of Examples I through IV. The methods employed were (1) refluxing with excess acetic anhydride for 1–2 hours and recovery of the resultant dianhydride and (2) heating the dried products at 130–230° C. under vacuum (10 millimeters) over a 1–2 hour period. The products from the second procedure contained a mixture of monoanhydride and dianhydride, but no free acid of substantial amount.

The anhydrides prepared from the product of Example I were discolored and would be considered to be undesirable for many commercial applications such as for use in the curing of epoxy resins.

The anhydrides obtained from the purified products of Examples II through IV were greatly improved in color, and especially the anhydrides of the products of Examples II and IV. Thus, the process of the present invention renders the crude product suitable for use in commercial applications where a light color or freedom from discoloration is desirable.

*Example VI*

The crude cis,cis,cis,cis - 1,2,3,4 - cyclopentanetetracarboxylic acid product of Example I was recrystallized from water which would normally be considered to be an excellent solvent for removing nitrogen-containing impurities. However, anhydrides prepared by the procedures of Example V from the water-crystallized product were very discolored Even after repeated recrystallizations from water, the crude material of Example I still produced discolored anhydrides.

*Example VII*

The purified product of Example III was further purified by the crystallization procedure of Example IV. Anhydrides prepared from the resultant purified product by the procedures of Example V were entirely free from any traces of discoloration.

What is claimed is:

1. A process for purifying 1,2,3,4-cyclopentanetetracarboxylic acid comprising reducing the nitrogen-containing impurity content of 1,2,3,4-cyclopentanetetracarboxylic acid including nitrogen-containing impurities produced during the preparation thereof by crystallizing from a solvent comprising by volume about 10–80 parts of water and about 90–20 parts of at least one alkanoic monocarboxylic acid having 1–4 inclusive carbon atoms, the 1,2,3,4-cyclopentanetetracarboxylic acid being prepared by a process comprising nitric acid oxidation of bicyclo(2,2,1)-5-heptene-2,3-dicarboxylic anhydride.

2. The process of claim 1 wherein the solvent comprises by volume about 20–40 parts of water and about 80–60 parts of acetic acid.

3. The process of claim 1 wherein the solvent comprises by volume about 20–40 parts of water and about 80–60 parts of formic acid.

4. A process for purifying 1,2,3,4-cyclopentanetetracarboxylic acid comprising intimately contacting solid 1,2,3,4-cyclopentanetetracarboxylic acid including nitrogen-containing impurities produced during the preparation thereof with a liquid selected from the group consisting of at least one alkanoic monocarboxylic acid having 1–4 inclusive carbon atoms and aqueous solutions thereof containing up to 20% by volume of water, separating the liquid from the solid 1,2,3,4-cyclopentanetetracarboxylic acid to reduce the nitrogen-containing impurity content, and then crystallizing the resultant 1,2,3,4-cyclopentanetetracarboxylic acid from a solvent comprising by volume about 10–80 parts of water and about 90–20 parts of at least one alkanoic monocarboxylic acid having 1–4 inclusive carbon atoms, the 1,2,3,4-cyclopentanetetracarboxylic acid being prepared by a process comprising nitric acid oxidation of bicyclo (2,2,1)-5-heptene-2,3-dicarboxylic anhydride.

5. In a process for preparing an anhydride of 1,2,3,4-cyclopentanetetracarboxylic acid wherein the resultant anhydride is discolored, the 1,2,3,4-cyclopentanetetracarboxylic acid being prepared by a process comprising nitric acid oxidation of bicyclo (2,2,1)-5-heptene-2,3-dicarboxylic anhydride and including nitrogen-containing impurities produced during the preparation thereof, the improvement comprising preparing the anhydride from 1,2,3,4-cyclopentanetetracarboxylic acid which has been purified by a process comprising crystallizing the 1,2,3,4-cyclopentanetetracarboxylic acid including impurities from a solvent comprising by volume about 10–80 parts of water and about 90–20 parts of at least one alkanoic monocarboxylic acid containing 1–4 inclusive carbon atoms to reduce the impurity content.

6. The process of claim 5 wherein the 1,2,3,4-cyclopentanetetracarboxylic acid which is crystallized from the solvent has been intimately contacted with a liquid comprising at least one alkanoic carboxylic acid containing 1–4 inclusive carbon atoms to reduce the impurity content prior to the crystallization.

7. A process for purifying cis,cis,cis,cis-1,2,3,4-cyclopentanetetracarboxylic acid comprising reducing the nitrogen-containing impurity content of cis-cis-cis,cis-1,2,3,4-cyclopentanetetracarboxylic acid including nitrogen-containing impurities produced during the preparation thereof by crystallizing from a solvent comprising by volume about 50 parts of water and about 50 parts of at least one alkanoic monocarboxylic acid having 1–4 inclusive carbon atoms, the cis,cis,cis,cis-1,2,3,4-cyclopentanetetracarboxylic acid being prepared by a process comprising nitric acid oxidation of endo-bicyclo(2,2,1)-5-heptene-2,3-dicarboxylic anhydride.

8. The process of claim 7 wherein the solvent comprises by volume about 50 parts of water and about 50 parts of acetic acid.

9. The process of claim 7 wherein the solvent comprises by volume about 50 parts of water and about 50 parts of formic acid.

10. The process of claim 7 wherein prior to crystallizing from the solvent, solid cis,cis,cis,cis-1,2,3,4-cyclopentanetetracarboxylic acid is intimately contacted with a liquid selected from the group consisting of alkanoic monocarboxylic acids containing 1–4 carbon atoms and aqueous solutions thereof containing up to 20% by volume of water, and the liquid is separated from the solid cis,cis,cis,cis - 1,2,3,4 - cyclopentanetetracarboxylic acid to reduce the impurity content thereof.

11. The process of claim 10 wherein the liquid contacted with the solid cis,cis,cis,cis-1,2,3,4-cyclopentanetetracarboxylic acid is glacial acetic acid, and the crystallization solvent contains about 50 parts by volume of acetic acid and about 50 parts by volume of water.

References Cited by the Examiner

UNITED STATES PATENTS

| | | | |
|---|---|---|---|
| 2,203,628 | 6/40 | Hopff et al. | 260—346.8 |
| 3,036,127 | 5/62 | Chafetz | 260—346.8 |
| 3,080,418 | 3/63 | Sullivan | 260—346.3 |

NICHOLAS S. RIZZO, *Primary Examiner.*

IRVING MARCUS, *Examiner.*

UNITED STATES PATENT OFFICE
CERTIFICATE OF CORRECTION

Patent No. 3,194,816                                    July 13, 1965

Ross Van Volkenburgh et al.

It is hereby certified that error appears in the above numbered patent requiring correction and that the said Letters Patent should read as corrected below.

Column 7, lines 19 to 36, the formulas should appear as shown below instead of as in the patent:

(1) 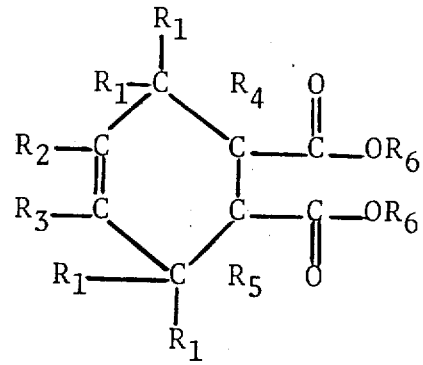

(2) 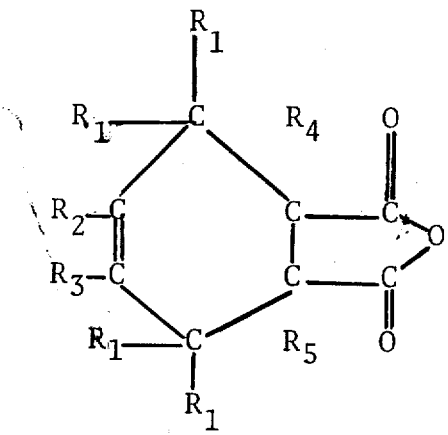

Signed and sealed this 24th day of May 1966.

(SEAL)
Attest:
ERNEST W. SWIDER                          EDWARD J. BRENNER
Attesting Officer                      Commissioner of Patents